(12) United States Patent
Atay

(10) Patent No.: US 9,046,543 B2
(45) Date of Patent: Jun. 2, 2015

(54) METHOD AND APPARATUS FOR MEASURING SPEED OF A BRUSH MOTOR

(75) Inventor: Stefan Mark Atay, Lexington, KY (US)

(73) Assignee: Lexmark International, Inc. KY (US)

( * ) Notice: Subject to any disclaimer, the term of this patent is extended or adjusted under 35 U.S.C. 154(b) by 518 days.

(21) Appl. No.: 13/493,665

(22) Filed: Jun. 11, 2012

(65) Prior Publication Data

US 2012/0330595 A1      Dec. 27, 2012

Related U.S. Application Data

(60) Provisional application No. 61/500,128, filed on Jun. 22, 2011.

(51) Int. Cl.
   *H02P 1/26*      (2006.01)
   *G01P 3/46*      (2006.01)
   *G01P 3/48*      (2006.01)

(52) U.S. Cl.
   CPC .... *G01P 3/46* (2013.01); *G01P 3/48* (2013.01)

(58) Field of Classification Search
   CPC ................................. H02P 1/28; H02K 17/08
   USPC .................................. 318/779, 778, 767, 727
   See application file for complete search history.

(56) References Cited

U.S. PATENT DOCUMENTS

| | | | |
|---|---|---|---|
| 5,850,130 A | 12/1998 | Fujisaki et al. | |
| 6,081,091 A * | 6/2000 | Mitchell et al. | ........... 318/685 |
| 6,941,096 B2 | 9/2005 | Matsuda et al. | |
| 7,668,690 B2 | 2/2010 | Schneider et al. | |
| 8,169,178 B2 | 5/2012 | Letor et al. | |
| 8,525,464 B2 | 9/2013 | Tanaka et al. | |
| 2011/0299868 A1 | 12/2011 | Ito et al. | |
| 2012/0326704 A1 | 12/2012 | Attay | |
| 2012/0326705 A1 | 12/2012 | Attay | |

OTHER PUBLICATIONS

File history for U.S. Appl. No. 13/493,754.
File history for U.S. Appl. No. 13/493,777.

* cited by examiner

*Primary Examiner* — David S Luo

(57) ABSTRACT

A system for determining motor speed of a brush DC motor in an apparatus, including circuitry for sensing current in the brush DC motor; a first filter for receiving a substantially DC component of the sensed current and parameters corresponding to the brush DC motor, for calculating a speed estimate thereof; an adaptive bandpass filter having a center frequency corresponding to the speed estimate of the first filter, for receiving the sensed current and substantially isolating a periodic current fluctuation thereof; a block for determining a frequency of the periodic current fluctuation, the periodic current fluctuation frequency being a commutation frequency of the brush DC motor and corresponding to motor speed of the brush DC motor. The motor speed determined from the periodic current fluctuation of the motor current is then used to control the speed of the motor.

20 Claims, 8 Drawing Sheets

METHOD AND APPARATUS FOR MEASURING SPEED OF A BRUSH MOTOR

CROSS REFERENCES TO RELATED APPLICATIONS

Pursuant to 35 U.S.C. §119, this application claims the benefit of the earlier filing date of Provisional Application Ser. No. 61/500,128, filed Jun. 22, 2011, entitled "Observer-based Brush Motor Speed Measurement Using Electrical Current Feedback," the content of which is hereby incorporated by reference herein in its entirety.

BACKGROUND

1. Technical Field

The present application relates generally to devices including a brush DC motor, and particularly to an improved brush DC motor monitoring system for determining motor speed.

2. Description of the Related Art

Motors are used in numerous applications to provide a motive force and/or motion to articles needing to be moved. Systems for controlling motor speed are also well known. For example, motor speed control systems may use encoders or the like for tracking the speed of brush motors. Unfortunately, encoders are relatively expensive thereby making encoder-based motor speed monitoring systems cost prohibitive in some designs and a less attractive solution in other designs.

What is needed, then, is an improved motor monitor system which accurately monitors motor speed and provides a more cost effective solution.

SUMMARY

Example embodiments overcome the shortcomings of prior systems and thereby satisfy a significant need for a system and method for accurately determining the speed of a brush DC motor in a relatively cost effective manner. In accordance with an example embodiment, there is shown an apparatus having a brush DC motor and a system for determining motor speed thereof. The system may include memory having stored therein model parameters corresponding to the brush DC motor; first circuitry for sensing a current in the windings of the brush DC motor and digitizing same; a Kalman filter for receiving a substantially DC component of the sensed, digitized current, the applied motor drive voltage and the stored model parameters and calculating a speed estimate of the brush DC motor; an adaptive bandpass filter having a center frequency corresponding to the speed estimate of the Kalman filter, for filtering the sensed, digitized current of the brush DC motor; a zero crossing detect block for receiving a filter output of the adaptive bandpass filter for identifying consecutive zero crossings thereof, a time period between consecutive zero crossings indicating a commutation frequency of the brush DC motor; and a calibration block for regularly calibrating the Kalman filter block. The system may also use interpolation for more accurately identifying the zero crossings.

In performing the calibration, the calibration block may receive a Fourier transform of the sensed, digitized current at each of a plurality of open loop motor speeds. Then, for each open loop motor speed, the calibration block may identify a peak frequency in proximity to an expected motor speed, and curve fit the peak frequencies to speed estimates of the Kalman filter to determine a scale factor and offset. The determined scale factor and offset may be thereafter used by the Kalman filter in calculating speed estimates of the motor.

Further, the calibration block may run the brush DC motor at a number of closed loop speeds and the determined commutation frequencies from the zero crossing block may be curve fit to speeds estimates calculated by the Kalman filter. In particular, the calibration block may receive, at several motor speeds, speed estimates from the Kalman filter and corresponding commutation frequency values that are based in part on the determined scale factor and offset, curve fit the corresponding commutation frequency values to the speed estimates, and generate refined scale factor and offset for use by the Kalman filter in estimating future speed estimates of the brush DC motor.

BRIEF DESCRIPTION OF THE DRAWINGS

The above-mentioned and other features and advantages of the various embodiments, and the manner of attaining them, will become more apparent and will be better understood by reference to the accompanying drawings, wherein.

DETAILED DESCRIPTION

Figure 1:
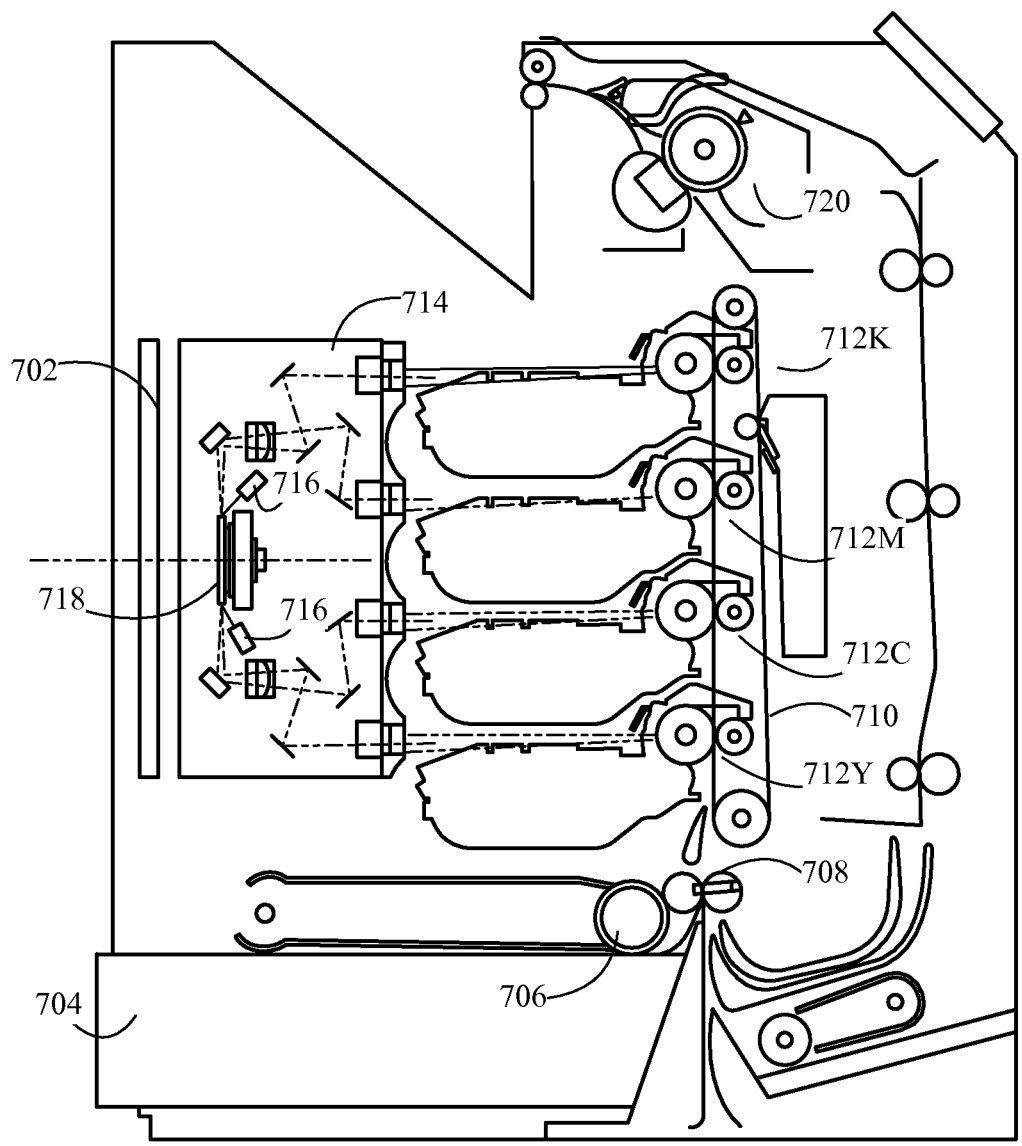
FIG. 1 is a side view of an electrophotographic imaging device incorporating hardware and algorithms of the example embodiments.

The following description and drawings illustrate embodiments sufficiently to enable those skilled in the art to practice it. It is to be understood that the subject matter of this application is not limited to the details of construction and the arrangement of components set forth in the following description or illustrated in the drawings. The subject matter is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present application as defined by the appended claims.

Also, it is to be understood that the phraseology and terminology used herein is for the purpose of description and should not be regarded as limiting. The use of "including,"

"comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Example embodiments are directed to a system for monitoring the speed of a motor, such as a brush DC motor. The example embodiments may be implemented in hardware and/or firmware in an integrated circuit coupled to or otherwise associated with the motor. The integrated circuit may include a general purpose processor, processing element, microcontroller or like device which executes firmware components of the example embodiments. The present disclosure has applications in apparatuses, systems and devices utilizing a motor. Though the example embodiments of the present disclosure are described below in connection with an image forming device, such as a printer or copier, it is understood such embodiments have similar use in other products.

Referring now to the drawings and particularly to FIG. 1, there is shown an electrophotographic image forming apparatus 700, in this case a color laser printer. An image to be printed is electronically transmitted to a print engine processor or controller 702 by an external device (not shown) or may comprise an image stored in a memory of the controller 702. The controller 702 includes system memory, one or more processors, and other logic necessary to control the functions of electrophotographic imaging.

In performing a print operation, the controller 702 initiates an imaging operation where a top substrate of a stack of media is picked up from a media or storage tray 704 by a pick mechanism 706 and is delivered to a substrate transport apparatus formed by a pair of aligning rollers 708 and a substrate transport belt 710 in the illustrated embodiment. The substrate transport belt 710 carries the picked substrate along a substrate path past each of four image forming stations 712 which apply toner to the substrate. The image forming station 712K includes a photoconductive drum that delivers yellow toner to the substrate in a pattern corresponding to a black (K) image plane of the image being printed. The image forming station 712M includes a photoconductive drum that delivers magenta toner to the substrate in a pattern corresponding to the magenta (M) image plane of the image being printed. The image forming station 712C includes a photoconductive drum that delivers cyan toner to the substrate in a pattern corresponding to the cyan (C) image plane of the image being printed. The image forming station 712Y includes a photoconductive drum that delivers yellow toner to the substrate in a pattern corresponding to the yellow image plane of the image being printed. The controller 702 regulates the speed of the substrate transport belt 710, substrate pick timing, and the timing of the image forming stations 712 to effect proper registration and alignment of the different image planes to the substrate.

To effect the imaging operation, the controller 702 manipulates and converts data defining each of the KMCY image planes into separate corresponding laser pulse video signals, and the video signals are then communicated to the LSU or printhead 714. The printhead 714 may include four laser light sources 716 (only two illustrated for reasons of clarity), at least one polygonal mirror 718 supported for rotation about a rotational axis for reflecting the light beams generated by the laser light sources 716, and post-scan optical systems receiving the reflected light beams emitted from the laser light sources 716. Each laser of the laser light sources 716 emits a respective laser beam which is reflected off the rotating polygonal mirror 718 and is directed towards a photoconductive drum of a corresponding image forming station 712 by select lenses and mirrors in the post-scan optical systems of printhead 714. Following impingement of laser beams across the photoconductive drums, toner is collected onto the impinged regions which is then transferred to the substrate sheet, after which the transferred toner is fused onto the sheet as it passes through fuser 720, which fuses the toner by application of heat and pressure.

Image forming apparatus 700 may utilize a number of brush DC motors. For example, a brush DC motor may be used for spinning polygonal mirror 718, rotating rolls in image forming stations 712, rotating a roll in fuser 720, moving pick mechanism 706 for picking a top sheet of media from a stack thereof, etc. In accordance with an example embodiment, image forming apparatus 700 may include a monitoring system which may be used in controlling the speed of one or more brush DC motors therein.

It has been observed that during operation of the brush DC motor, the current therein contains a periodic component due to winding commutation that is seen as periodic current fluctuations or current ripple. These periodic current fluctuations have a frequency that is related to the motor rotational speed by a fixed ratio of twice the number of rotor poles per motor revolution. Example embodiments of the present disclosure are directed to detecting the frequency of the ripple current of a brush DC motor so that the detected frequency may be used in a closed loop control system to relatively accurately and inexpensively control the speed of the brush DC motor.

Figure 2:
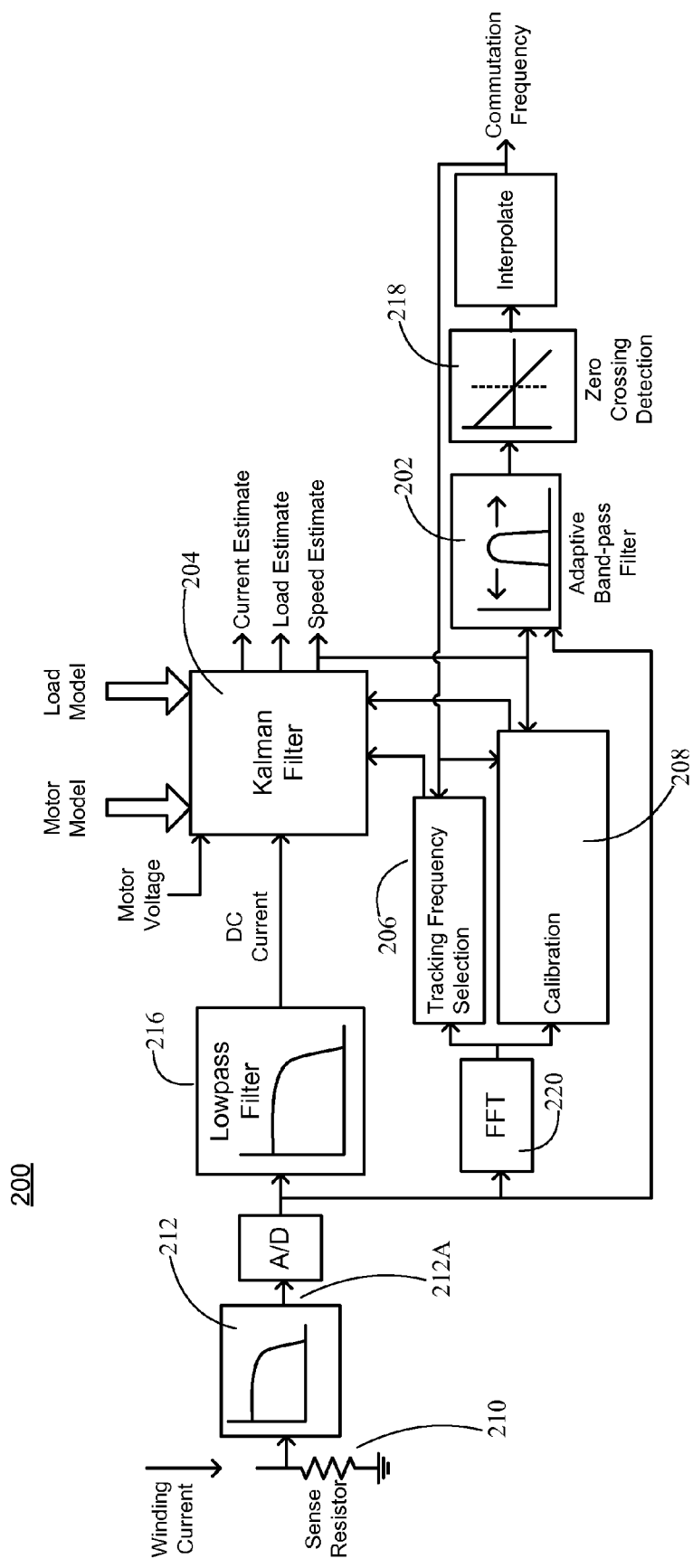
FIG. 2 is a block diagram of a motor monitoring system according to an example embodiment.

Referring to FIG. 2, there is shown a monitoring system 200 for monitoring a brush DC motor appearing in image forming apparatus 700. Monitoring system 200 may utilize both hardware and software/firmware to monitor the speed of the brush DC motor. In general terms, monitoring system 200 may utilize an adaptive bandpass filter 202 for isolating the frequency of the motor ripple current from which a measurement is made to determine the frequency of the periodic current fluctuations, or commutation frequency. In setting and/or selecting the passband of adaptive bandpass filter 202, monitoring system 200 may use a coarse speed estimate of motor speed. In particular, Kalman filter 204 generates a coarse motor speed estimate which becomes the passband center frequency of adaptive bandpass filter 202. Further, monitoring system 200 may include a tracking frequency selection block 206 that selectively determines whether a frequency other than the commutation frequency may be a better frequency to track, and reconfigure monitoring system 200 accordingly. In addition, monitoring system 200 may include a calibration block 208 which regularly calibrates monitoring system 200 in order to more accurately determine the speed of the brush motor. Such calibration may, for example, update model characteristics of the brush motor used by Kalman filter 204 which may change over time. In addition or in the alternative, calibration block 208 may identify motor parameters to be downloaded for use by Kalman Filter 204 in estimating the speed of the brush motor.

Monitoring system 200 may have circuitry, including at least one sense resistor 210, for coupling to the brush DC motor. An analog low pass filter 212 may be coupled to receive a voltage appearing across sense resistor 210 and generate a filtered output signal 212A. Filtered output signal 212A may be provided to an analog-to-digital converter (ADC) 214 which generates at its output a digital value corresponding to the current of the filtered output signal 212A. A lowpass filter 216 receives the digital output from ADC 214 and provides a low frequency output signal to Kalman filter 204. The low frequency output signal may be a substantially DC current.

In general, Kalman filters use a series of measurements observed over time, containing noise (random variations) and other inaccuracies, and produce estimates of unknown variables that tend to be more precise than those that would be based on a single measurement alone. More formally, a Kalman filter operates recursively on streams of noisy input data to produce a statistically accurate estimate of the underlying system state. Kalman filters are generally well known such that the specific details of Kalman filter 204 will not be described herein for reasons of simplicity.

Kalman filter 204 estimates the speed of the brush motor so that the center passband frequency of adaptive bandpass filter 202 may be set for selecting the desired frequency component from the motor current signal. Kalman filter 204 receives the filtered output signal from lowpass filter 216 for use in estimating motor speed. Kalman filter 204 may also estimate motor speed based upon model parameters for the load of the brush DC motor and model parameters of the brush DC motor itself. In addition, Kalman filter 204 may estimate motor speed based upon a voltage signal corresponding to the drive signal for driving the brush DC motor, which may be a pulse width modulated (PWM) signal. In addition to providing a motor speed estimate, Kalman filter 204 may provide an estimate of motor current as well as an estimate of the load of the brush DC motor.

It is understood that other observer, estimator and/or predictor blocks may be utilized instead of Kalman filter 204. For instance, a Luenberger observer may be used.

After Kalman filter 204 generates a speed estimate of the brush DC motor that falls outside of the upper or lower edge of a predetermined center portion CP (FIG. 3) within the passband of adaptive bandpass filter 202, adaptive bandpass filter 202 shifts its passband center frequency based upon the recent motor speed estimate from Kalman filter 204. In an example embodiment, adaptive bandpass filter 202 may be an infinite impulse response (IIR) filter. It is understood, though, that other digital bandpass filters may be utilized instead of an IIR filter, such as a finite impulse response (FIR) filter. Adaptive bandpass filter 202 substantially isolates the periodic current fluctuations of the brush DC motor, with the period of the current fluctuations being related to motor speed as discussed above. Selectively shifting of the passband center frequency may be performed according to a filter schedule and filter switching algorithm for adaptive bandpass filter 202.

Figure 3:
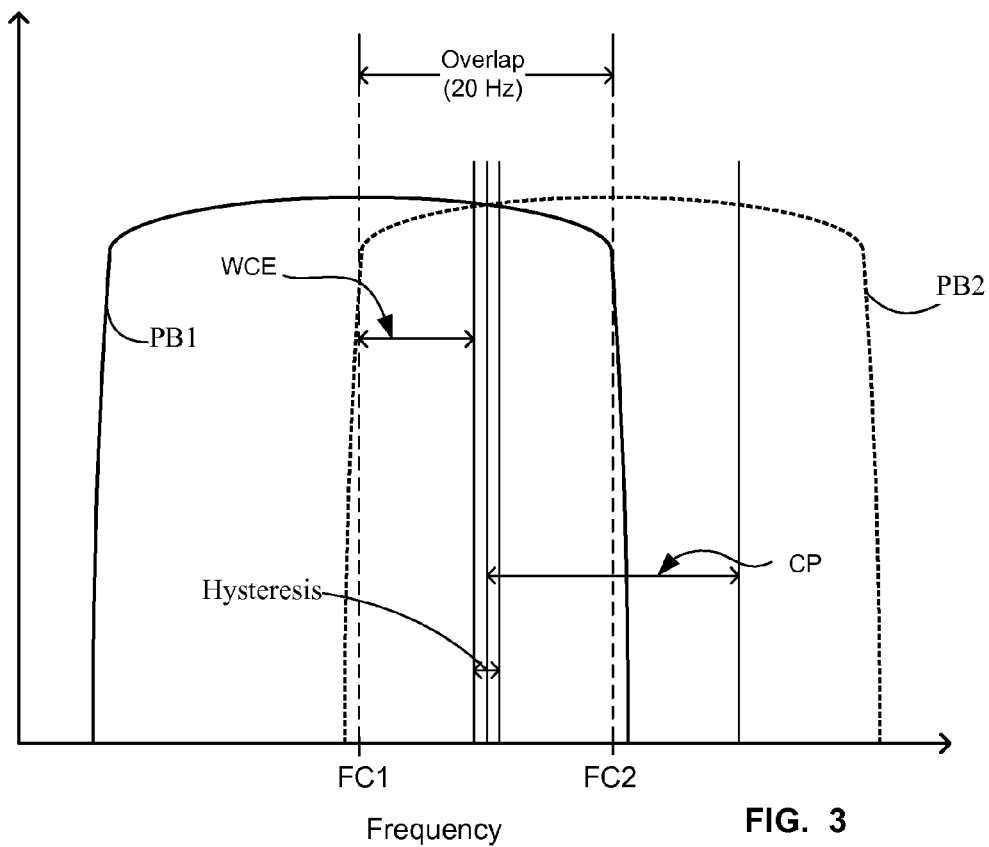
FIG. 3 is an illustration of a filter design of a bandpass filter of the system of FIG. 2 according to an example embodiment.

FIG. 3 illustrates the filter schedule of adaptive bandpass filter 202 according to an example embodiment. Selectable passbands PB1 and PB2 are illustrated. The width of passbands PB1 and PB2 are predetermined. The offset of center frequencies FC1 and FC2 of consecutive passbands PB1 and PB2, respectively, may be about half of the passband width. Having center frequency offsets to be about half the width of the passbands PB substantially reduce dead zones and decrease the accuracy needed by the coarse speed estimate from Kalman filter 204. In an example embodiment, the width of the passbands (e.g., PB1 and PB2) for adaptive bandpass filter 202 may be about 40 Hz and the offset of center frequencies (e.g., FC1 and FC2) may be about 20 Hz. The offset of center frequencies also corresponds to the overlap between passbands. FIG. 3 also indicates a worst case error (WCE) that is tolerated in the coarse speed estimate as well as the predetermined center portion CP of passband PB2 which is used to determine when the passband PB of adaptive bandpass filter 202 should be switched to a different passband.

Figure 4:
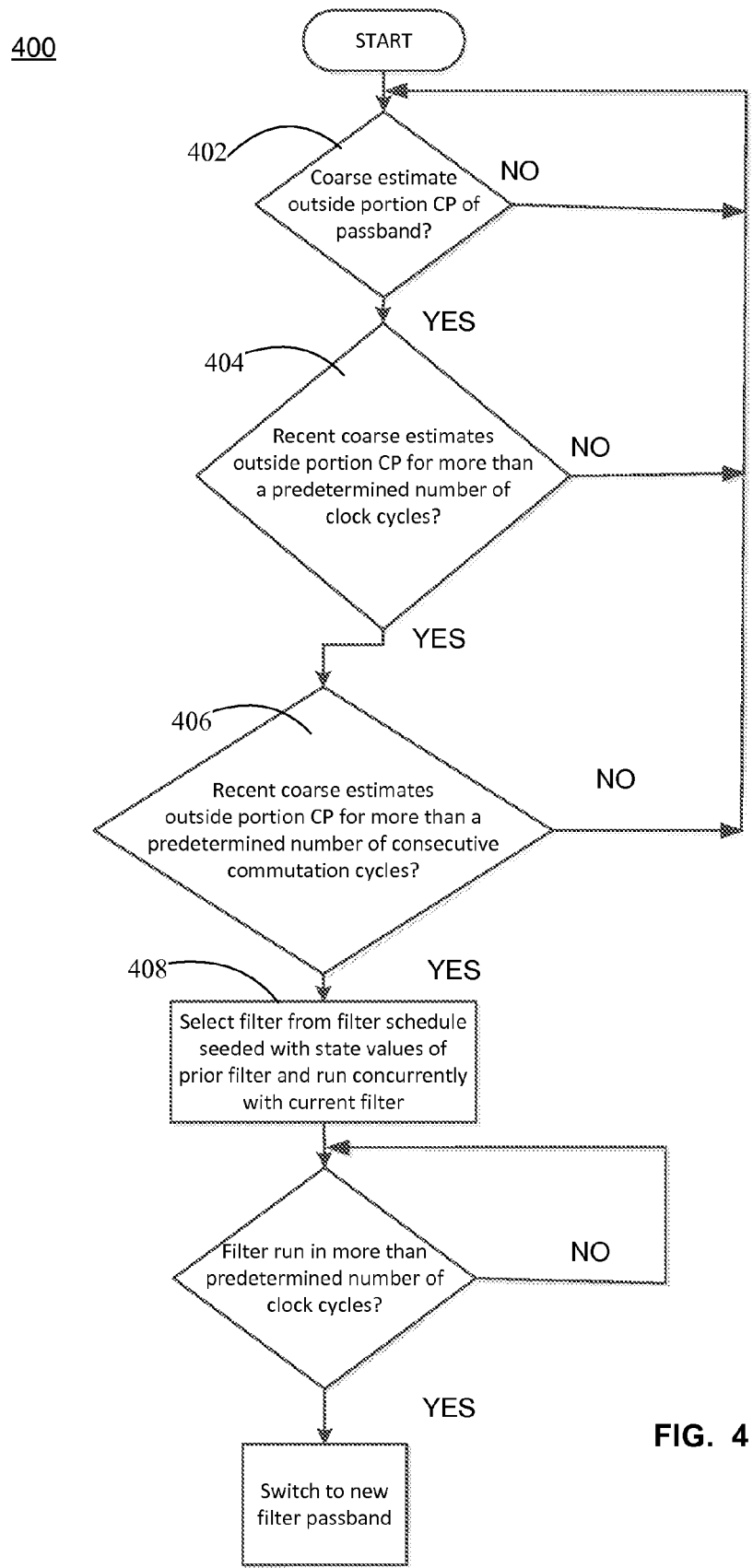
FIG. 4 is a flowchart illustrating a filter switching algorithm for the bandpass filter of FIG. 2 according to an example embodiment.

The filter schedule for adaptive bandpass filter 202 may contain hysteresis to avoid relatively rapid switching between passbands. Hysteresis, illustrated in FIG. 3, occurs in the transition between passbands PB1 and PB2. FIG. 4 illustrates a flowchart of an algorithm 400 for switching between passbands PB of adaptive bandpass filter 202 according to an example embodiment. At 402, a determination is made whether the most recent coarse estimate of motor speed by Kalman Filter 204 is outside the predetermined center portion CP of passband PB currently used by adaptive bandpass filter 202. If the recent coarse speed estimate lies outside of the predetermined center portion CP of the current passband PB, a determination is made at 404 whether the most recent coarse speed estimates have been outside of the predetermined center portion CP of the current passband PB for more than a predetermined number of consecutive clock cycles of the corresponding processor executing the firmware for monitoring system 200. Upon an affirmative determination, another determination is then made at 406 whether the most recent coarse speed estimates of the brush DC motor have been outside of the predetermined center portion CP of the current passband PB used by adaptive bandpass filter 202 for more than a predetermined number of consecutive commutation cycles of the brush DC motor. Actions 404 and 406 serve as debounce filters to prevent rapid switching between passbands PB. If the most recent coarse estimates have been outside of the predetermined center portion CP of the current filter passband for more than the predetermined number of consecutive clock cycles and commutation cycles, then at 408 a new passband $PB_{new}$ is selected for adaptive bandpass filter 202 and seeded with state values of the previous filter passband PB. Adaptive bandpass filter 202 will then be configured with the new passband $PB_{new}$ (having a new center frequency corresponding to the most recently estimated motor speed by Kalman filter 204) following a run-in period exceeding a predetermined number of clock cycles. The run-in period is used to allow the transient effects of filter passband switching to decay before being used and to avoid false measurements due to phase changes from one passband to the next.

As mentioned above, adaptive bandpass filter 202 is configured to define a passband PB for use in determining the frequency of the periodic current fluctuations or commutation frequency, from which it can be determined the speed of the brush DC motor due to the relationship between commutation frequency and motor speed. Adaptive bandpass filter 202 filters the digitized signal from ADC 214 so as to pass only the commutation frequency component thereof. A zero cross detect block 218 monitors the output of adaptive bandpass filter 202, determines the zero crossings thereof and generates timestamps for the zero crossings. Interpolation and hysteresis may be used to increase the resolution of the zero crossing detections and prevent false detections, respectively. The delta between successive zero crossings may be used to determine the commutation period and hence commutation frequency of the brush DC motor. Once the commutation frequency of the motor is determined, motor speed is calculated based upon the above-mentioned relationship between commutation frequency and motor speed. The motor speed calculation may then be used in a closed loop system for controlling the speed of the brush DC motor.

There has been observed some instances in which the commutation frequency may not be the best frequency to determine motor speed by monitoring system 200. In particular, as the brushes of the brush DC motor wear over time, the commutation frequency appearing in the current signal may be relatively small compared to commutation harmonic frequencies. In addition, the commutation frequency of the brush DC motor may become less isolated over time as more and more harmonic components of the commutation frequency appear over time, thus making it more difficult to filter or otherwise separate the commutation frequency for determining motor speed. This is particularly difficult at low speeds when frequencies are closer together. According to an example embodiment, monitoring system 200 may include tracking frequency selection block 206 which determines whether a better frequency exists to track and, if so, the relationship between the better frequency and the current (commutation) frequency being used by monitoring system 200.

Figure 5:
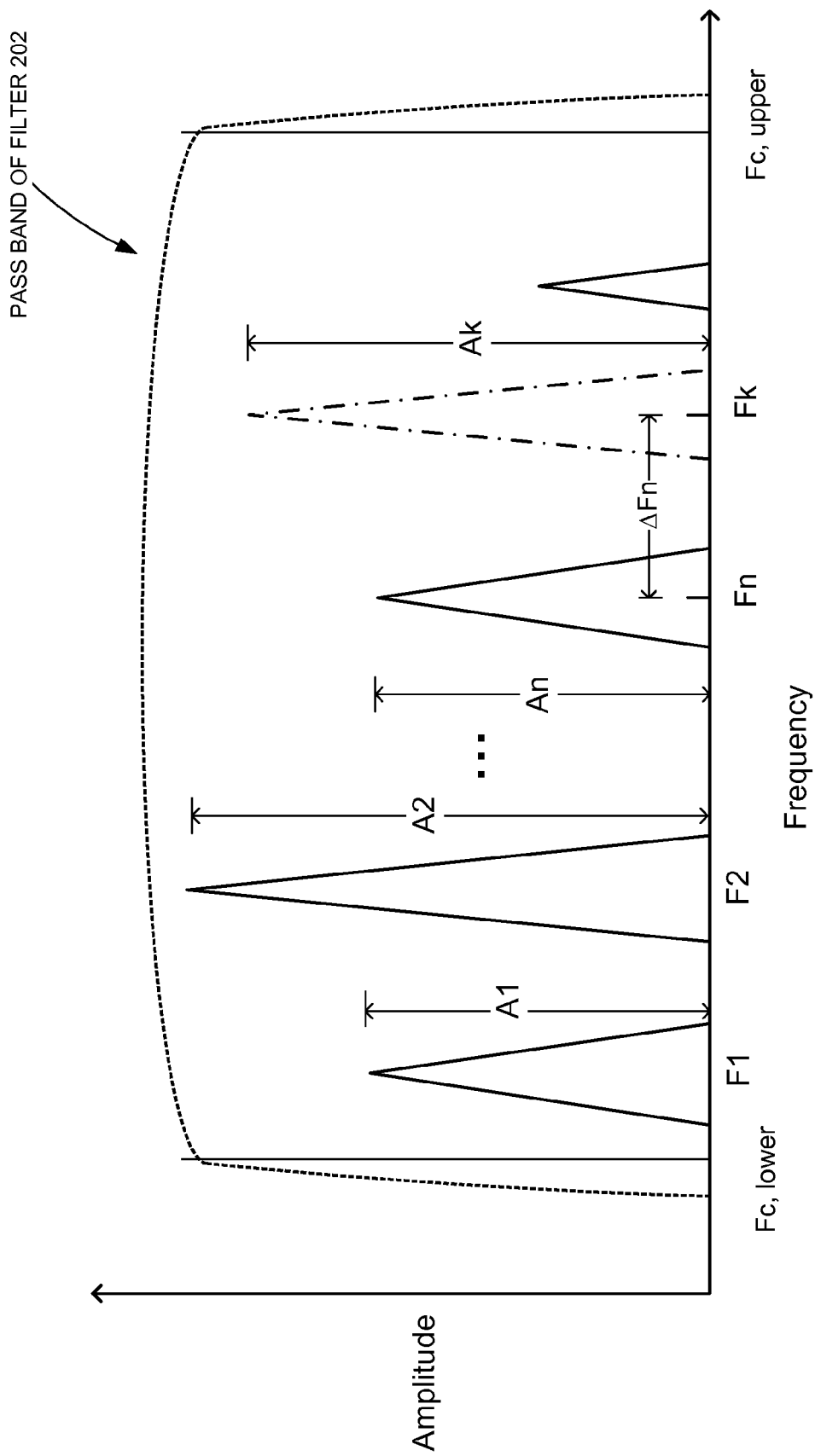
FIG. 5 is an illustration depicting tracking frequency selection of a better or best frequency for use by the system of FIG. 2 according to an example embodiment.

As shown in FIG. 2, a Fast Fourier Transform (FFT) block 220 receives the digitized current output from ADC 214. Tracking frequency selection block 206 receives the output of FFT block 220 and locates prominent frequencies F, i.e., those frequencies whose peak amplitude is greater than the mean peak amplitude over the entire frequency spectrum. FIG. 5 illustrates the peaks A appearing at the prominent frequencies F from the Fast Fourier Transform of the digitized current signal from ADC 214 within the passband of adaptive bandpass filter 202 encompassing prominent frequencies $F_1$-$F_k$. Tracking frequency selection block 206 selects a better or best tracking frequency from among the prominent frequencies F, including prominent frequencies both inside and outside of the filter passband.

According to an example embodiment, tracking frequency selection block 206 assigns a cost to each prominent frequency index k based upon the ratio of peak amplitude $A_k$ to other peak amplitudes and the proximity to other peaks A. In particular, larger peak amplitudes $A_k$ yield better signal-to-noise ratios and make zero crossing detection more reliable. Further, naturally isolated peaks are easier to filter and reduce the likelihood of beating from the occurrence of two peaks that are close together in frequency. Beating reduces the reliability of zero crossing detection and creates frequency distortion, thereby introducing error in the motor speed estimate. Tracking frequency selection block 206 uses a predetermined cost function in assigning a cost value to each prominent frequency index k in the pass band (Fc, lower to Fc, upper) of adaptive bandpass filter 202.

Specifically, the predetermined cost function may associate a cost value $J_k$ to a frequency index k according to the equation $$J_k = \alpha \sum_{p=0}^{P} \frac{A_p}{A_k} + \beta \sum_{n=Lower\ cutoff}^{Upper\ cutoff} \frac{A_n}{A_k |k-n|}$$

where p refers to a particular prominent frequency index, P refers to the number of prominent frequencies (i.e., the number of frequencies having a prominent signal contribution), $A_n$ is the amplitude of the signal component at a particular frequency index n in the passband of adaptive bandpass filter 202 encompassing prominent frequency index k, α is a predetermined amplitude weight coefficient, and β is a predetermined proximity weight coefficient. The first term in the equation is thus a cost function component corresponding to the magnitude of the peak amplitude at prominent frequency index k relative to the similar peak amplitudes at the other prominent frequency indices. The second term in the equation relates to the distance between peak amplitudes. The best prominent frequency for tracking is the prominent frequency having the smallest cost value J. Once the cost value J for each prominent frequency index k is calculated and the smallest cost value identified, and assuming the corresponding prominent frequency index k is not the current frequency tracked by Kalman Filter 204, Kalman Filter 204 is updated to reflect the new tracking frequency.

Figure 6:
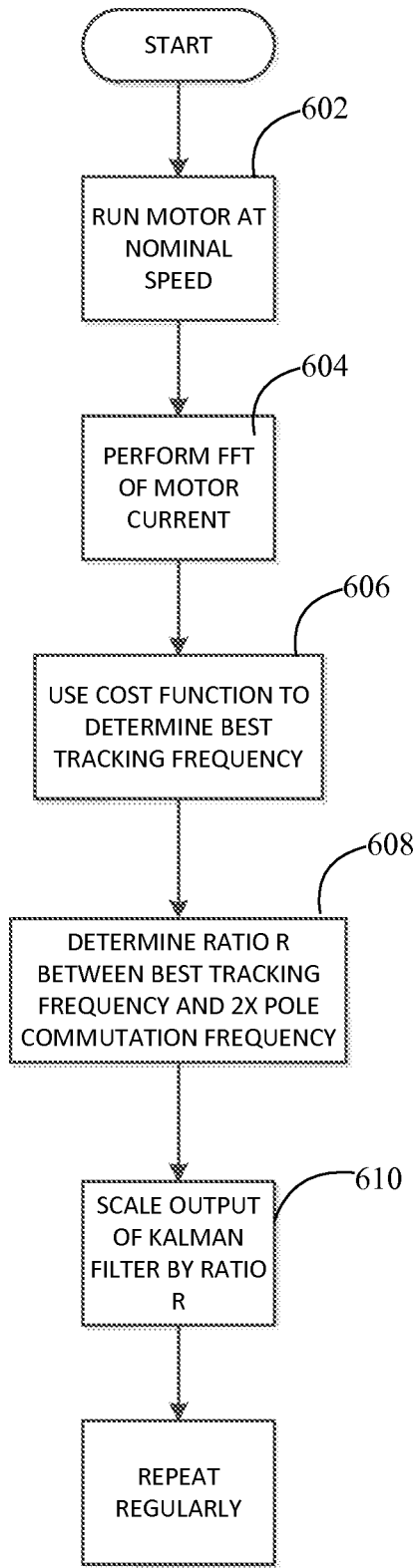
FIG. 6 is a flowchart of a frequency selection algorithm for the bandpass filter of FIG. 2 according to an example embodiment.

FIG. 6 illustrates an algorithm 600 for selecting a new tracking frequency according to another example embodiment. First, the brush DC motor is run at a nominal speed at 602. At 604, FFT block 220 performs an FFT of the digitized current value appearing at the output of ADC 214. Tracking frequency selection block 206 applies at 606 the cost function to identify the best tracking frequency from the prominent frequencies of the output of FFT block 220. Next, at 608 tracking frequency selection block 206 determines the ratio R between the best tracking frequency and the 2×-pole commutation frequency using the measured speed. The ratio R may be expressed as:

$$R = (k_{optimum}/(T_{sample} * N_{sample}))/2 * Npoles * \omega$$

where $k_{optimum}$ is a sample index corresponding to the best frequency, $T_{sample}$ is the sampling period in seconds, $N_{sample}$ is the number of current samples in the FFT of the digitized current value, Npoles is the number of poles of the brush DC motor and w is the motor speed, in revolutions per second when the FFT was acquired. At 610, the output of Kalman Filter 204 is scaled by ratio R, which causes adaptive bandpass filter 202 to center on the best tracking frequency. These actions 602-610 are then repeated sufficiently frequently and/or regularly to relatively timely account for brush wear in the brush DC motor. For example, the analysis for determining whether a new tracking frequency is needed may be performed each time image forming apparatus 700 performs a power-on-reset operation.

As mentioned, Kalman filter 204 calculates a coarse speed estimate based upon, among other factors, model parameters corresponding to the motor and to the motor's load. In addition to regularly investigating whether a better frequency is needed to serve as the center frequency for adaptive bandpass filter 202 to account for changes in motor wear over time, monitoring system 200 updates the motor model parameters used by Kalman filter 204 so as to relatively accurately follow changes to the brush DC motor as it wears over time. Such updating of the motor model parameters may be performed, for example, on a regular or periodic basis. According to an example embodiment, monitoring system 200, and particularly Kalman filter 204, may be regularly calibrated by a calibration block 208 to account for changes in operating characteristics of the motor. In general terms, the FFT of the digitized current signal, i.e., the output of FFT block 220, is searched for peaks in the vicinity of the speed estimate of Kalman filter 204, and the speed estimate is then corrected with a gain and/or scaling factor value and offset value determined by performing a first order curve fit of the speed estimate to the speeds obtained from the FFT operation. The curve fit may be performed using a recursive least squares method, for example.

Figure 7:
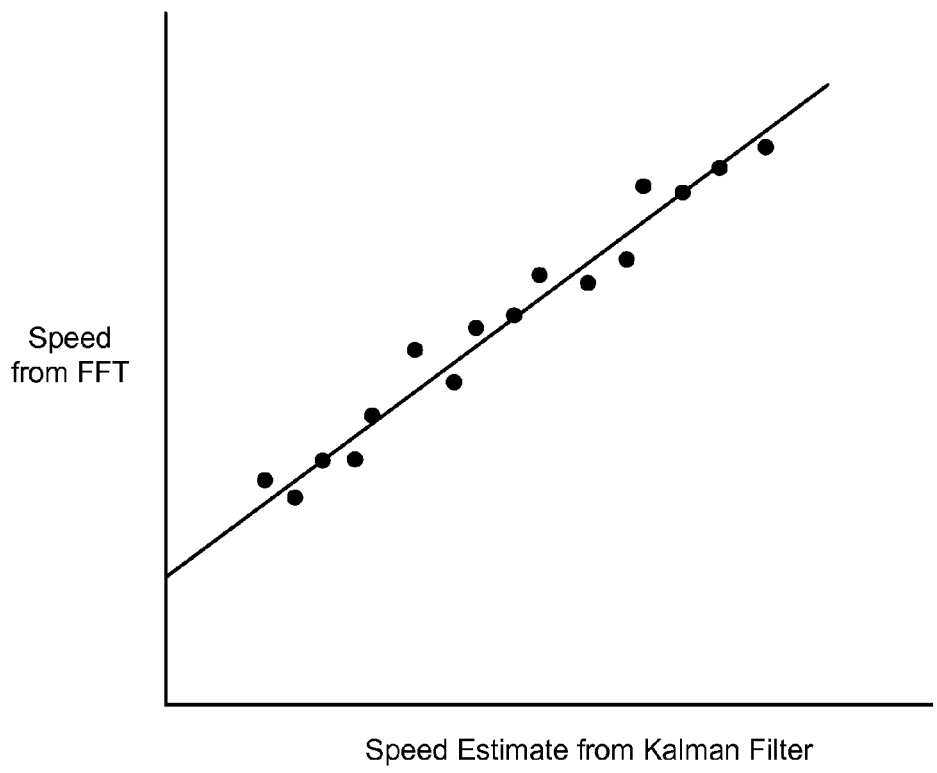
FIG. 7 is a graph illustrating a calibration algorithm for calibrating the Kalman filter of FIG. 2 according to an example embodiment.
Figure 8:
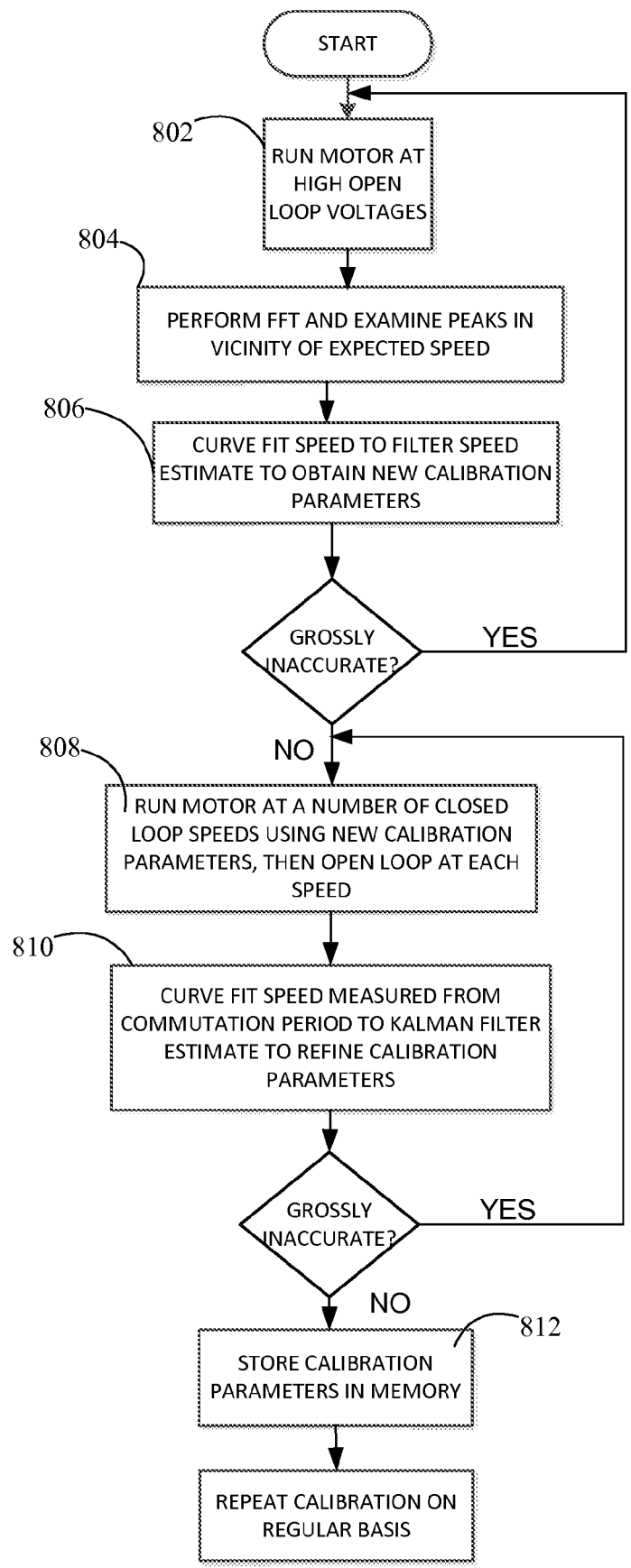
FIG. 8 is a flowchart illustrating the calibration algorithm for calibrating the Kalman Filter of FIG. 2 according to an example embodiment.

FIGS. 7 and 8 illustrate the calibration process performed by calibration block 208 according to an example embodiment. The brush DC motor is run at 802 at a number of relatively high open loop voltages and/or speeds, resulting in the frequencies being more isolated from their corresponding harmonic frequencies. At each open loop voltage, an FFT is performed at 804 on the digitized current signal by FFT block 220 and the peak frequency in the vicinity of the expected speed, based upon coarse speed estimates by Kalman filter 204, is identified. From the peak frequencies identified from running the brush DC motor at several high open loop voltages, the coarse speed estimates of Kalman filter 204 are curve fit to the identified frequencies at 806 to determine calibration parameters, namely the gain (or scaling factor) and offset. If either the gain or offset or both is determined to be grossly incorrect, then the process begins again at 802 or 804. FIG. 7 illustrates the curve fitting of the coarse speed estimates of filter 204 to the peak frequencies identified. The coarse speed estimate of Kalman filter 204 is then corrected using the determined gain and offset calibration parameters.

The calibration may be further enhanced by curve fitting the coarse speed estimate by Kalman filter 204 to the motor speed identified using adaptive bandpass filter 202 and zero crossing detection block 218. Specifically, the brush DC motor is run at several closed loop speeds using the new calibration parameters (gain and offset) at 808. At each closed loop speed, the motor is switched to run open loop in order to prevent switching of passband frequencies. The frequencies determined from zero cross detection block 218 during each open loop period are curve fit at 810 to the coarse frequency estimate of Kalman filter 204, and the calibration parameters are further refined accordingly. A determination may then be made as to whether the refined calibration parameters are grossly incorrect, in which case the process returns to 808. This determination may be made in addition to or in lieu of the determination above following act 806. The refined calibration parameters may be maintained in nonvolatile memory at 812 for use by Kalman filter 204. This calibration process may be performed on a regular basis to relatively closely follow parameter changes to the brush DC motor over time due to wear. For example, the calibration process may be performed each time image forming apparatus 700 completes a power-on-reset operation.

In addition or in the alternative to the above-described calibrating, calibration block 208 may utilize knowledge of the motor speed, such as from an FFT of the digitized, sensed current or a determination of commutation speed, the sensed current and motor drive voltages to identify online in real time the appropriate motor model parameters to use. The identifying may use a recursive least squares algorithm or the like to identify the motor model parameters. The identified motor model parameters may be regularly downloaded into nonvolatile memory and update the motor model parameters of Kalman filter 204. For example, this process may occur following a power on reset operation by image forming apparatus 700.

As mentioned, example embodiments of the present disclosure may be implemented in hardware and software/firmware. For instance, Kalman filter 204, adaptive bandpass filter 202, zero crossing detect block 208, FFT block 220, tracking frequency selection block 206 and calibration block 208 may be implemented in firmware that is executed by a controller or processor associated with the brush DC motor. In image forming apparatus 700, controller 702 may execute the firmware for the brush DC motors appearing therein.

Figure 9:
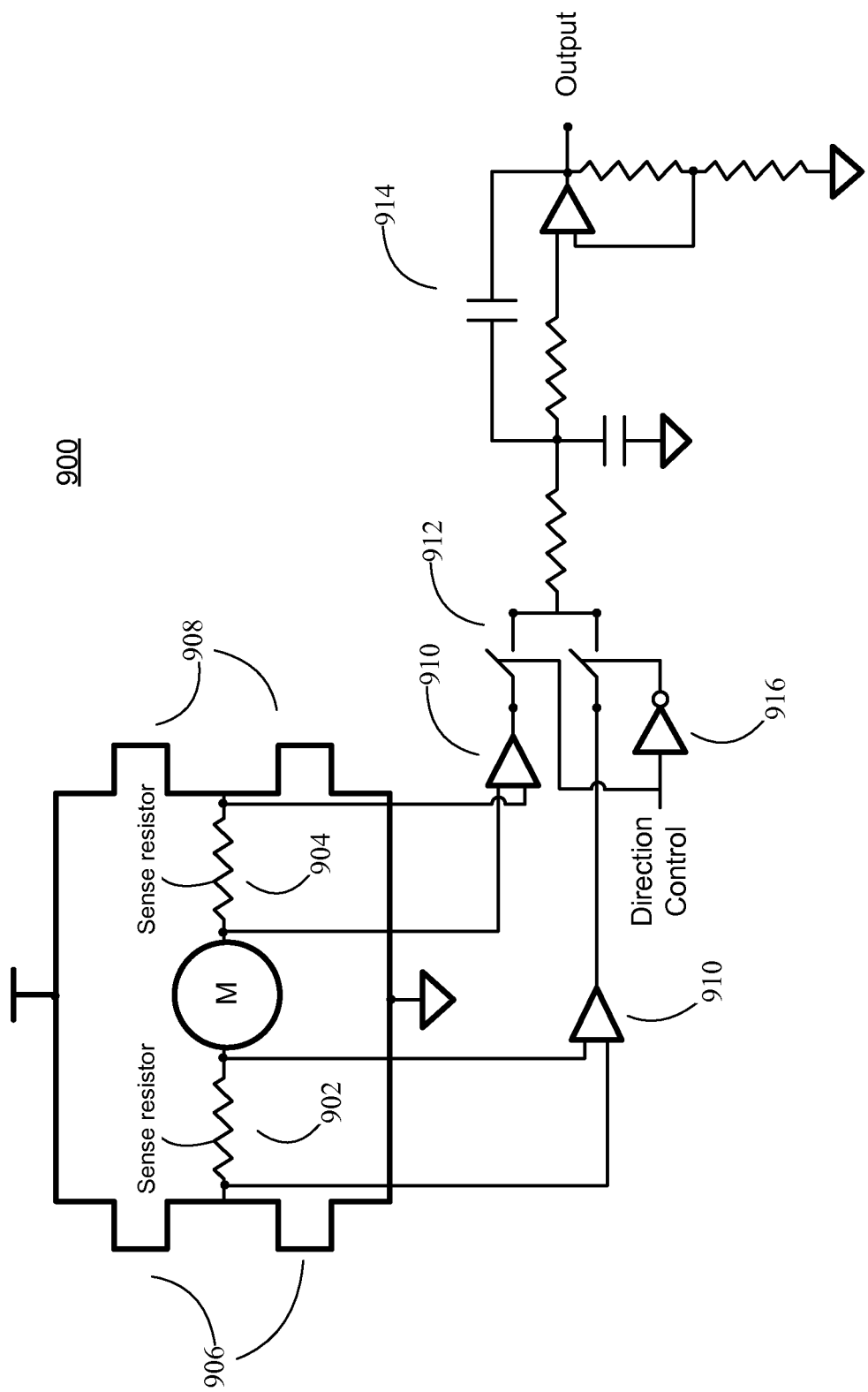
FIG. 9 is a diagram illustrating a current sensing circuit according to an example embodiment.

FIG. 9 illustrates a circuit 900 for sensing the current in a brush DC motor M that may be utilized by current monitoring system 200. Sense resistors 902, 904 may sense current in motor M. In particular, sense resistor 902 may be coupled between motor M and a pair of motor drive transistors 906, and sense resistor 904 may be likewise coupled between motor M and a pair of motor drive transistors 908. Each sense resistor 902, 904 may be coupled to a distinct differential amplifier 910, which amplifies the voltage appearing across the sense resistor. Analog switches 912 may serve as an analog multiplexer to switch the output of one of differential amplifiers 910 to an anti-aliasing filter 914 as selected by a control signal 916. The output of filter 914 may then be coupled to the input of analog lowpass filter 212 of current monitoring system 200.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. In an apparatus having a brush DC motor, a system for determining motor speed thereof, comprising:
    memory having stored therein model parameters corresponding to the brush DC motor;
    first circuitry for sensing a current in windings of the brush DC motor and digitizing same;
    a first filter for receiving a substantially DC component of the sensed, digitized current and the stored model parameters and for calculating a speed estimate of the brush DC motor;
    an adaptive bandpass filter having a center frequency corresponding to the speed estimate of the first filter, for filtering the sensed, digitized current of the brush DC motor to isolate a periodic current fluctuation component thereof;
    a zero crossing detect block for receiving the isolated periodic current fluctuation component of the adaptive bandpass filter and identifying consecutive zero crossings thereof, a time period between consecutive zero crossings corresponding to motor speed of the brush DC motor; and
    a calibration block for regularly calibrating the first filter block.

2. The system of claim 1, wherein the calibration block calibrates the first filter block during or following power on reset operations performed by the apparatus.

3. The system of claim 1, wherein the calibration block provides a scale factor and offset for the first filter to calculate the speed estimate of the brush DC motor.

4. The system of claim 3, wherein calibration block is configured to
    receive a Fourier transform of the sensed, digitized current at each of a plurality of open loop motor speeds, and
    for each open loop motor speed, identify a peak frequency in proximity to an expected motor speed, and curve fit the peak frequencies to speed estimates of the first filter to determine the scale factor and offset.

5. The system of claim 4, wherein the block is further configured to
    receive, at several motor speeds, speed estimates from the first filter based in part on the determined scale factor and offset, and corresponding commutation frequency values,
    curve fit the corresponding commutation frequency values to the speed estimates based in part on the determined scale factor and offset, and
    generate a refined scale factor and offset for use by the first filter in estimating future speed estimates of the brush DC motor.

6. The system of claim 5, wherein the curve fit of the commutation frequency values to the speed estimates is a first order curve fit.

7. The system of claim 5, wherein the curve fit of the commutation frequency values to the speed estimates comprises a recursive least squares curve fit.

8. The system of claim 4, wherein the curve fit is a first order curve fit.

9. The system of claim 1, further comprising a processing element, wherein at least one of the first filter, the adaptive bandpass filter, the zero crossing detect block and the calibration block is implemented in firmware executed by the processing element.

10. A method of determining motor speed of a brush DC motor, comprising:

sensing a current from the brush DC motor;

low pass filtering the sensed current to produce a low frequency current signal;

filtering the low frequency current signal to estimate motor speed based in part upon model parameters of the brush DC motor;

bandpass filtering the sensed current to generate a bandpass filtered signal, wherein the bandpass filtering uses the estimated motor speed as a center frequency thereof;

detecting zero crossings of the bandpass filtered signal, wherein a frequency of the detected zero crossings corresponds to the motor speed of the brush DC motor; and calibrating, on a regular basis, the filtering of the low frequency current signal.

11. The method of claim 10, wherein the filtering of the low frequency current signal comprises filtering using a Kalman filter.

12. The method of claim 10, wherein the calibrating comprises operating the brush DC motor at a plurality of open loop frequencies and sensing motor current at each open loop frequency to obtain sensed open loop currents; for each sensed open loop current, performing a Fourier Transform and locating a corresponding peak frequency near an expected motor speed; curve fitting the located peak frequencies to an expected motor speed to generate a scaling value and offset, and applying the scaling value and offset to the filtering of the low frequency current signal.

13. The method of claim 12, wherein the calibrating further comprises operating the brush DC motor at a plurality of speeds based in part upon the scaling factor and the offset to determine a commutation frequency value for each speed; and curve fitting the determined commutation frequency values to corresponding speed estimates to obtain a second scaling factor and offset for use in subsequent calibrating.

14. The method of claim 12, wherein the curve fitting comprises a first order curve fitting.

15. A system for determining motor speed of a brush DC motor in an apparatus, comprising:

a first filter for receiving a substantially DC component of a sensed current of the brush DC motor and parameters corresponding to the brush DC motor, for calculating a speed estimate thereof;

an adaptive bandpass filter having a center frequency corresponding to the speed estimate of the first filter, for receiving the sensed current and substantially isolating a periodic current fluctuation thereof;

a frequency detect block for determining a frequency of the periodic current fluctuation, a frequency of the periodic current fluctuation corresponding to motor speed of the brush DC motor; and a calibration block for regularly calibrating the first filter.

16. The system of claim 15, further comprising a processor, wherein one or more of the first filter, the adaptive bandpass filter and the calibration block comprises firmware executed by the processor.

17. The system of claim 15, wherein the first filter comprises a Kalman filter and the calibration block generates a scale factor and an offset for modifying the speed estimate generated by the first filter.

18. The system of claim 17, wherein calibration block is configured to receive a Fourier transform of the sensed current at each of a plurality of open loop motor speeds, and for each open loop motor speed, identify a peak frequency in proximity to an expected motor speed, and curve fit the peak frequencies to speed estimates of the first filter to determine the scale factor and offset.

19. The system of claim 18, wherein the calibration block is further configured to receive, at several motor speeds, speed estimates from the first filter based in part on the determined scale factor and offset, and corresponding commutation frequency values from the frequency detect block, curve fit the corresponding commutation frequency values to the speed estimates based in part on the determined scale factor and offset, and generate a refined scale factor and offset for use by the first filter in estimating future speed estimates of the brush DC motor.

20. The system of claim 15, wherein the calibration block calibrates the first filter following the apparatus performing a power on reset operation.

* * * * *